B. MORELAND.
Harvester-Reel.
No. 212,318. Patented Feb. 18, 1879.
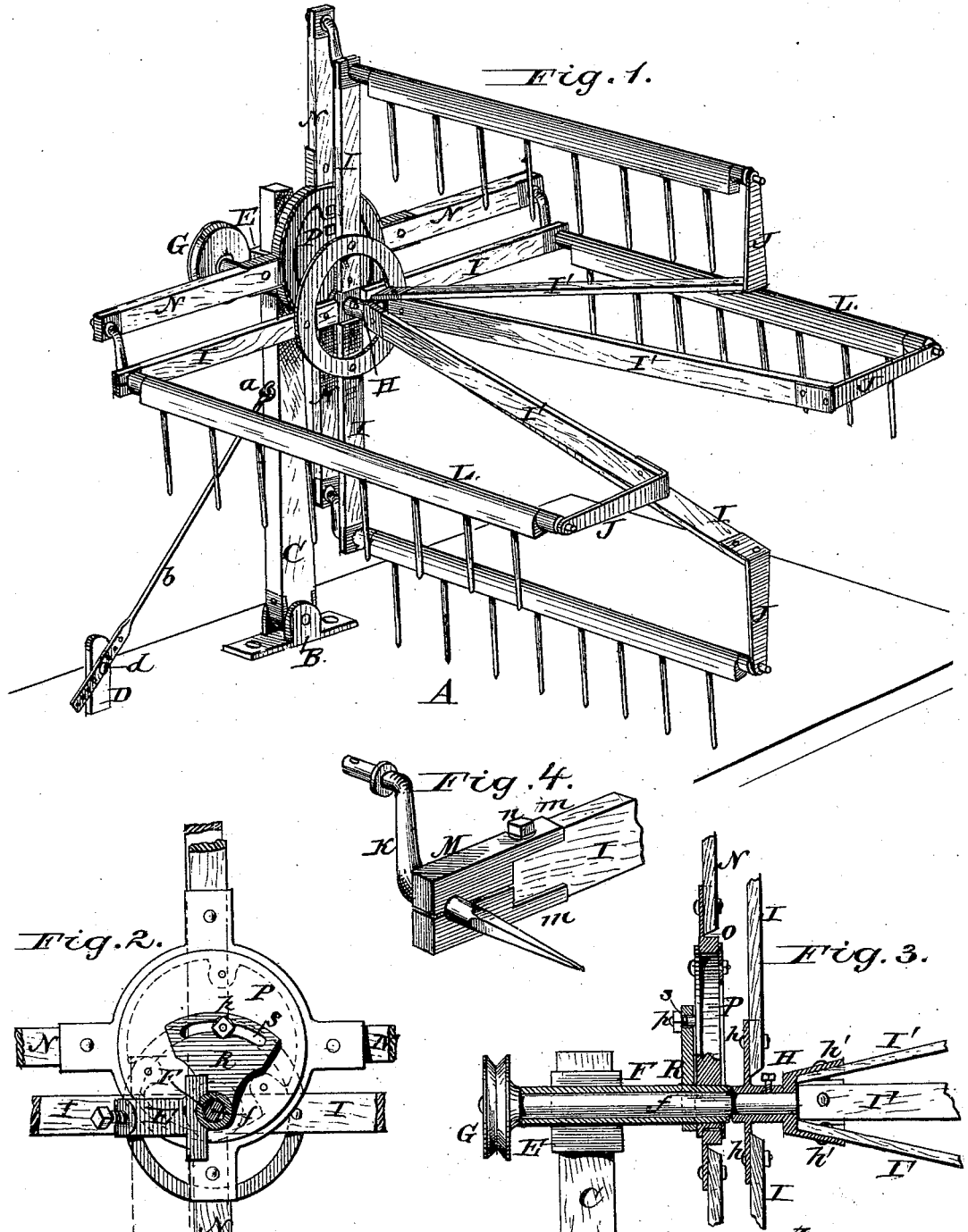

UNITED STATES PATENT OFFICE.

BUN MORELAND, OF PATASKALA, OHIO.

IMPROVEMENT IN HARVESTER-REELS.

Specification forming part of Letters Patent No. 212,318, dated February 18, 1879; application filed November 12, 1878.

*To all whom it may concern:*

Be it known that I, BUN MORELAND, of Pataskala, in the county of Licking and State of Ohio, have invented certain new and useful Improvements in Harvester-Reels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to harvester-reels, and has for its object to gather standing, lodged, or fallen grain.

The nature of the invention consists in adjustable rakes employed instead of the usual beaters, and revolving backward, while the reel revolves forward; also, in the construction and arrangement of devices for adjusting and holding the rakes, operating the reel and the rakes, and for adjusting the reel; and in the combination of parts, as will be hereinafter more fully set forth, and pointed out in the claims.

In the annexed drawings, to which reference is made, and which illustrate the invention, Figure 1 is a perspective view of the improved reel. Fig. 2 is a view of the inner end of the reel. Fig. 3 is a longitudinal section of the same. Fig. 4 is an enlarged perspective view of the crank in the inner end of one of the reel-arms.

A represents a part of the harvester-platform, at a suitable point upon which is secured a shoe, B. In this shoe is pivoted the lower end of the reel-standard C. To an eyebolt, $a$, in the standard C is connected a rod, $b$, which extends rearward, and has its rear end flattened and perforated for attachment to a post, D, by a bolt, $d$. By these means the reel-standard C can be adjusted as required, to throw the reel backward or forward. On the upper portion of the standard C is placed a sleeve or loop, E, which is adjustable up and down thereon, and fastened at any point desired by means of a set-screw. This sleeve or loop is provided with an elongated tubular bearing, F, to receive the reel-shaft $f$. On the outer end of the shaft $f$ is a pulley, G, to receive motion, by belt or otherwise, from the operating parts of the harvester.

On the inner end of the shaft $f$ is secured a double spider, H, which has radial wings $h$ and inclined wings $h'$, as shown in Fig. 3. Arms I and I' are attached, respectively, to the arms $h$ and $h'$, substantially as shown, the arms I' being, at their outer ends, provided with metal straps J, running parallel with the radial reel-arms I. In each corresponding arm I and strap J is mounted a rake, L, consisting of a head and, preferably, straight teeth. The outer end of the rake is hung on a journal in the outer end of the strap J, while in the inner end of the rake is inserted a crank, K, which passes through a clutch-bearing, M, fastened on the end of the arm I. This clutch-bearing is made in two parts, as shown in Fig. 4, each part forming a half-round bearing and a flange or projection, $m$. The two flanges $m$ $m$ are fitted on the end of the arm I, and fastened thereto by a single bolt, $n$, by tightening the nut of which the two sections of the clutch-bearing can be drawn closer together, to take up lost motion occasioned by wear of the crank or the bearing. These clutch-bearings also serve the purpose of metal tips for the arms I.

The outer end of the crank K is inserted through the end of an arm, N. There is one arm N for each reel-arm I, and said arms N are fastened radially to an annular spider, O, which is placed around an eccentric, P. This eccentric is placed loosely on the tubular bearing F, and held by means of a bolt securely to an arm, R, which projects from the inner end of the tubular bearing F.

It will readily be seen that as the reel revolves, the arms N are, by the cranks K, also carried around; but as said arms N revolve around a stationary eccentric, the cranks are made to rotate independent of the rotation, giving to the rakes a backward revolution at the same time as the reel revolves forward.

The arm R is provided with a slot, $s$, for the passage of the fastening-bolt $p$, which secures the eccentric, and said eccentric can therefore be adjusted in such a manner as to bring the teeth of the rakes down onto the platform in a vertical position, or more or less inclined in either direction, as the state of the grain may require. In either case, it will be noticed, the rakes, while they rotate in their bearings, are immovable in general tendency, and maintain always the same position with relation to the platform.

The mechanism is simple, and yet efficient and durable.

Having thus described my invention, what I claim, and desire to secure by Letters Patent, is—

1. In a harvester-reel, a series of rakes mounted in the reel-arms, and provided at their inner ends with cranks, in combination with a separate set of arms attached to a spider rotating around a stationary but adjustable eccentric, substantially as and for the purposes herein set forth.

2. In a harvester-reel, the combination of the double spider H, reel-arms I I', straps J, and rakes L, substantially as and for the purposes herein set forth.

3. The clutch-bearing M, made in two parts, with flanges $m$, for fastening to the reel-arm I, in combination with the crank K and rake L, for the purposes herein set forth.

4. The combination of the spider O, with radial arms N, the eccentric P, and stationary slotted arm R, with bolt $p$, for adjusting the eccentric, as herein set forth.

In testimony that I claim the foregoing as my own I affix my signature in presence of two witnesses.

BUN MORELAND.

Witnesses:
AARON YOUMANS,
WM. H. MEAD.